US010239988B2

United States Patent
Ilmenev et al.

(10) Patent No.: US 10,239,988 B2
(45) Date of Patent: Mar. 26, 2019

(54) URETHANE VINYL COPOLYMERS AND IMPACT RESISTANT SHEETS MADE THEREFROM

(71) Applicant: PolyOne Designed Structures and Solutions LLC, Avon Lake, OH (US)

(72) Inventors: Pavel E. Ilmenev, Ridgefield, CT (US); Carlos B. Guerra, Fairfield, CT (US)

(73) Assignee: Spartech LLC, St. Louis, MO (US)

( * ) Notice: Subject to any disclaimer, the term of this patent is extended or adjusted under 35 U.S.C. 154(b) by 0 days.

(21) Appl. No.: 15/115,545

(22) PCT Filed: Feb. 3, 2015

(86) PCT No.: PCT/US2015/014276
§ 371 (c)(1),
(2) Date: Jul. 29, 2016

(87) PCT Pub. No.: WO2015/119957
PCT Pub. Date: Aug. 13, 2015

(65) Prior Publication Data
US 2017/0166684 A1    Jun. 15, 2017

Related U.S. Application Data

(60) Provisional application No. 61/936,712, filed on Feb. 6, 2014.

(51) Int. Cl.
| | |
|---|---|
| *C08G 18/67* | (2006.01) |
| *C08J 5/18* | (2006.01) |
| *C08G 18/66* | (2006.01) |
| *C08G 18/32* | (2006.01) |
| *C08G 18/48* | (2006.01) |
| *C08G 18/75* | (2006.01) |
| *C08F 290/06* | (2006.01) |
| *C08G 18/24* | (2006.01) |
| *C08G 18/10* | (2006.01) |
| *C08G 18/65* | (2006.01) |

(52) U.S. Cl.
CPC ........ *C08G 18/675* (2013.01); *C08F 290/067* (2013.01); *C08G 18/10* (2013.01); *C08G 18/246* (2013.01); *C08G 18/3212* (2013.01); *C08G 18/4854* (2013.01); *C08G 18/6511* (2013.01); *C08G 18/6674* (2013.01); *C08G 18/6681* (2013.01); *C08G 18/758* (2013.01); *C08J 5/18* (2013.01); *C08J 2375/14* (2013.01)

(58) Field of Classification Search
None
See application file for complete search history.

(56) References Cited

U.S. PATENT DOCUMENTS

| | | |
|---|---|---|
| 3,641,199 A | 2/1972 | Niederhauser et al. |
| 3,859,381 A | 1/1975 | Hutchinson |
| 3,873,640 A | 3/1975 | Owston et al. |
| 4,971,837 A | 11/1990 | Martz et al. |
| 5,274,045 A | 12/1993 | Yukawa et al. |
| 5,539,053 A | 7/1996 | Avenel |
| 2007/0148471 A1 | 6/2007 | Rukavina et al. |
| 2008/0125504 A1 | 5/2008 | Reinheimer |
| 2012/0142871 A1 | 6/2012 | Zhong et al. |

FOREIGN PATENT DOCUMENTS

EP    0292975 A2    6/1988

OTHER PUBLICATIONS

International Search Report and Written Opinion for Application No. PCT/US2015/014276, dated Apr. 24, 2015, 12 pgs.

*Primary Examiner* — Robert T Butcher
(74) *Attorney, Agent, or Firm* — Armstrong Teasdale LLP

(57) ABSTRACT

Copolymers comprising a polyurethane segment, a polyvinyl segment and a multifunctional monomer having first and second functional groups covalently bound to the polyurethane segment and polyvinyl segment, respectively, are disclosed. Cast sheets formed therefrom exhibit improved high impact resistance and similar optical properties as compared to polyvinyl cast sheets.

21 Claims, No Drawings

URETHANE VINYL COPOLYMERS AND IMPACT RESISTANT SHEETS MADE THEREFROM

CROSS-REFERENCE TO RELATED APPLICATIONS

This application claims the priority of International Application No. PCT/US2015/014276 filed on Feb. 3, 2015 and U.S. Provisional Application No. 61/936,712 filed on Feb. 6, 2014, each of which is incorporated by reference in its entirety.

FIELD OF THE INVENTION

The invention relates to copolymers comprising polyurethane and polyvinyl segments which are impact resistant, optically clear, and have low haze.

BACKGROUND OF THE INVENTION

Impact resistant clear sheets for applications such as aircraft windows and bullet-resistant security panels are often formed by laminating or co-joining vinyl (acrylic) sheet, polycarbonate and glass layers with polyurethane or polyvinyl butyral ("PVB") interlayers, such as by a heat-lamination process using urethane film for bonding.

Polyvinyl (polyacrylic) sheets are easily formed by cell casting from relatively non-hazardous and inexpensive materials. Problematically, polyvinyl is brittle and the formed sheets must be very thick or laminated with other materials (e.g., polycarbonate or polyurethane) in order to provide impact resistance sufficient to stop projectiles such as high-powered hand gun rounds.

Polyurethane cast sheets provide superior impact resistance properties as compared to polyvinyl. Problematically, as compared to polyvinyl, polyurethane cast sheet is made from more expensive raw materials and frequently involves the use of hazardous chemicals. Moreover, cast polyurethane is difficult to produce due, in part, to very high viscosity of the starting materials which often must be maintained at high temperatures so that they can be poured, difficulty with short pot life, and difficulties in releasing cast polyurethane from the casting surface.

There is a need in the art for polymeric material that can be easily cast as sheets, can be prepared from relatively non-toxic material, and that exhibits superior bullet and impact resistance, clarity, and low haze.

SUMMARY OF THE INVENTION

In one aspect of the present invention, a copolymer is provided. The copolymer comprises a reaction product of the components (i) a polyisocyanate having free isocyanate functionality, (ii) a vinyl monomer comprising at least one double bond, (iii) an optional polyol, and (iv) a multifunctional monomer. The multifunctional monomer comprises a first functional group reactive with the polyisocyanate and a second functional group comprising at least one double bond reactive with the at least one double bond of the vinyl monomer. The copolymer is characterized by an essential absence of free isocyanate.

In another aspect of the present invention, a method of making a cast sheet material is provided. The method comprises the steps of (a) forming a reaction mixture comprising (i) a polyisocyanate having free isocyanate functionality; (ii) a vinyl monomer comprising at least one double bond, (iii) an optional polyol, and (iv) a multifunctional monomer. The multifunctional monomer comprises a first functional group reactive with the polyisocyanate and a second functional group comprising a double bond reactive with the at least one double bond of the vinyl monomer. The reaction mixture is cast into a mold and the reaction mixture is reacted to form a copolymer cast sheet material.

In another aspect of the present invention, a multilayer structure comprising a first plate layer, a second plate layer, and an interlayer between the first plate layer and the second plate layer is provided. The interlayer comprises a copolymer comprising the reaction product of (i) a polyisocyanate having free isocyanate functionality, (ii) a vinyl monomer comprising at least one double bond, (iii) an optional polyol, and (iv) a multifunctional monomer comprising a first functional group reactive with the polyisocyanate and a second functional group comprising at least one double bond reactive with the at least one double bond of the vinyl monomer.

In other aspects of the present invention, a method of making a multilayer structure is provided. The method comprises the steps of: (a) providing a first plate layer and a second plate layer defining a cavity between the first plate layer and the second plate layer; and (b) casting into the cavity components comprising (i) a polyisocyanate having free isocyanate functionality, (ii) a vinyl monomer comprising at least one double bond, (iii) an optional polyol, and (iv) a multifunctional monomer comprising a first functional group reactive with the polyisocyanate and a second functional group comprising at least one double bond reactive with the at least one double bond of the vinyl monomer. The components are reacted to provide an interlayer comprising a copolymer thereof between the first plate and the second plate.

Various refinements exist of the features noted in relation to the above-mentioned aspects of the present invention. Further features may also be incorporated in the above mentioned aspects of the present disclosure as well. These refinements and additional features may exist individually or in any combination. For instance, various features discussed below in relation to any of the illustrated aspects of the present invention may be incorporated into any of the above described aspects of the present invention, alone or in any combination.

DETAILED DESCRIPTION OF THE INVENTION

The present invention is generally directed to a copolymer having a urethane polymer segment and a vinyl polymer segment, wherein the copolymer comprises the reaction product of a polyisocyanate having free isocyanate functionality, a vinyl monomer comprising at least one double bond and a multifunctional monomer comprising first and second functional groups, and wherein the first functional group is covalently bound to the urethane polymer and the second functional group is covalently bound (co-polymerized) with the vinyl polymer.

More particularly, the invention relates to transparent impact resistant sheet material combining the superior ballistic properties characteristic of certain polyurethane sheet material and the simplicity associated with polyvinyl sheet casting processes. The objects of the present invention are achieved by copolymerizing vinyl monomer(s) and urethane components or urethane precursors in the presence of a multifunctional monomer bearing two different types of functional groups: one functional group reactive with isocyanate functionality of the urethane component (via either an hydroxy- or amino-group) and the other functional group being a double bond that is copolymerizable with vinyl (acrylic) monomer. In some other aspects of the present invention, the polyisocyanate may be extended by including a polyol in the reaction mixture resulting in a change to the physical properties of the final copolymer. Used at ratios described herein, the multifunctional monomer ties together the two dissimilar vinyl and urethane polymers. This allows for a beneficial copolymer structure, providing improved impact resistance while avoiding adverse phase separation of the two dissimilar vinyl and urethane polymers, thus preserving transparency. Under one theory, and without being bound to any particular theory, it is believed that the copolymer possesses a "ladder-like" structure wherein the polyurethane chains function as long-chain cross-linkers (having from several hundred to several thousand molecular weight units) between very long vinyl polymer chains (having from several hundred thousand to several million molecular weight units).

In more detail, in any of the various aspects of the present invention disclosed herein, the copolymer comprises a polyurethane segment comprising polymerized polyisocyanate and optional polyol, a polyvinyl segment comprising polymerized vinyl monomer and a multifunctional monomer covalently bound to the polyurethane and polyvinyl segments via first and second functional groups, respectively. The multifunctional monomer comprises a first functional group comprising an active hydrogen atom reactive with isocyanate (N=C=O). In some aspects of the present invention, the multifunctional monomer second functional group comprises at least one double bond wherein the second functional group randomly copolymerizes with the vinyl monomer through the double bond functionality. The multifunctional monomer thereby provides a covalent bond linkage between the polyurethane polymer and the polyvinyl polymer that enables both the high impact resistance and the optical transparency objects of the invention to be achieved.

Various embodiments are within the scope of the present invention. Examples of some aspects include, but are not limited to, the following. Copolymers that are formed from a polyisocyanate, a vinyl monomer, a multifunctional monomer, and an optional polyol. Copolymers that are formed from a polyisocyanate that is partially pre-reacted with a polyol to form an urethane prepolymer bearing free isocyanate functionality, a vinyl monomer, a multifunctional monomer, and an optional polyol. Such urethane prepolymers are considered polyisocyanates for the purposes of the present invention. Many of such polyisocyanates and urethane prepolymers are available commercially with examples disclosed herein. The polyisocyanates and urethane prepolymers advantageously improve safety and industrial hygiene through reduced exposure to toxic monomeric isocyanates and further provide for processing simplification. Methods for producing said copolymers and cast sheets formed therefrom are also within the scope of the present invention.

Urethane Polymer Segment

In general, in some aspects of the present invention, the urethane polymer segment is formed from polyisocyanate and an optional polyol. In some other aspects of the present invention, the urethane polymer segment comprises a urethane prepolymer (polyisocyanate) as described herein. In any of the various aspects of the invention, the urethane polymer segment exhibits isocyanate functionality allowing it to react with one functional group of the multifunctional monomer.

Suitable polyisocyanates include those having the formula $R-(N=C=O)_n$, where R can be a straight or branched chain hydrocarbyl or substituted hydrocarbyl moiety containing from about 2 to about 20 carbon atoms, a straight or branched chain cyclic hydrocarbyl or substituted cyclic hydrocarbyl moiety containing from 4 to about 20 carbon atoms, a substituted or unsubstituted aromatic moiety containing from 6 to about 20 carbon atoms or from 6 to 14 carbon atoms, or combinations thereof, and where the number of isocyanate units, "n", is an integer or represents an average functionality of about 2 or greater, such from about 2 to about 3, or about 2.5. As used herein, "hydrocarbyl" refers to a molecule or residue consisting of carbon and hydrogen atoms, and "substituted hydrocarbyl" refers hydrocarbyl moieties which are substituted with at least one atom other than carbon including moieties in which a carbon chain atom is substituted with a heteroatom such as nitrogen, oxygen, silicon, phosphorous, boron, or a halogen atom, and moieties in which the carbon chain comprises additional substituents.

Examples of polyisocyanates within the scope of the present invention include, but are not limited to, the 2,2'-, 2,4'- and 4,4'-isomers of diphenylmethane diisocyanate ("MDI"), polymeric MDI, carbodiimide-modified liquid MDI, 4,4'-, 2,4-cis- and trans-isomers of dicyclohexylmethane diisocyanate ("$H_{12}$MDI"), µ-phenylene diisocyanate, m-phenylene diisocyanate, 2,4- and 2,6-isomers of toluene diisocyanate ("TDI"), 3,3'-dimethyl-4,4'-biphenylene diisocyanate, isophoronediisocyanate ("IPDI"), hexamethylene diisocyanate ("HDI"), naphthalene diisocyanate, xylene diisocyanate, m- and µ-tetramethylxylene diisocyanate ("TMXDI"), ethylene diisocyanate, propylene-1,2-diisocyanate, tetramethylene-1,4-diisocyanate, cyclohexyl diisocyanate, 1,5-pentamethylene diisocyanate, dodecane-1,12-diisocyanate, cyclobutane-1,3-diisocyanate, cyclohexane-1,3-diisocyanate; cyclohexane-1,4-diisocyanate, 1-isocyanato-3,3,5-trimethyl-5-isocyanatomethylcyclohexane, methyl cyclohexylene diisocyanate, isocyanurate of HDI, triisocyanate of 2,4,4-trimethyl-1,6-hexane diisocyanate, tetracene diisocyanate, napthalene diisocyanate, anthracene diisocyanate, polymethylene polyphenylisocyanate, and mixtures thereof. In some aspects of the present invention, the polyisocyanate monomer is dicyclohexyl methane diisocyanate.

In some aspects of the present invention, at least a portion of the free isocyanate is provided by a polyisocyanate having isocyanate functionality or a polyisocyanate that is partially pre-reacted with a polyol to form an urethane prepolymer. The amount of such free isocyanate (i.e., NCO) may be expressed as a weight percent of the polyisocyanate, and ranges from about 1% to about 50%, from about 4% to about 16%, or from about 6% to about 12% NCO groups based upon the total weight of the polyisocyanate. In some aspects, of the present invention, the polyisocyanate comprises less than about 30% free NCO, and in other aspects, less than about 14% free NCO, such as, from about 2% to about 12%, from about 4% to about 10%, or from about 6% to about 10%. Formed polyisocyanate molecular weight is typically about 200, 500, 1000, 1500, 2000, 2500, 3000, 3500, 4000, 4500 or 5000 Daltons, and ranges thereof, such as from about 200 to about 5000, from about 200 to about 3000 or from about 500 to about 2000 Daltons. Polyisocyanates are available commercially. Examples include Adiprene LFH2840 (diisocyanate-terminated polycaprolactone prepolymer having an average of 8.4 wt % free NCO), Adiprene LW750 (polyisocyanate having an average of 7.5 wt % free NCO), Adiprene LW 520 (polyisocyanate having an average of 4.75 wt % free NCO) and Baytec WP-260 (polyisocyanate having an average of 26.6 wt % free NCO).

In any of the various aspects of the present invention, the urethane polymer segment is formed from (i) a polyisocyanate and an optional polyol or (ii) polyisocyanate that is partially pre-reacted with a polyol to form an urethane prepolymer bearing free isocyanate functionality. In general, a copolymer reaction mixture is formed from the urethane polymer segment components, a polyurethane catalyst, vinyl monomer (as described herein), a vinyl polymerization initiator (as described herein), and multifunctional monomer (as described herein). The copolymer reaction mixture is heated to a temperature and held for a time sufficient to complete the polyurethane polymerization reaction. In some preferred aspects of the present invention, the polymerization reaction mixture is poured into a mold and the copolymer is then formed in the mold. Generally, urethane polymer formation is done by heating the reaction mixture to a temperature of from about 30° C. to about 150° C., from about 50° C. to about 150° C., from about 30° C. to about 120° C., from about 30° C. to about 70° C. or from about 30° C. to about 60° C. and holding for a time sufficient to complete the polymerization reaction, typically from about 1 to about 10 hours or from about 2 to about 8 hours. The temperature ranges may vary with the urethane catalyst species.

Suitable polyurethane catalysts are known in the art and include tertiary amines and metal complexes. Examples of tertiary amine catalysts include, without limitation, triethylenediamine (TEDA or DABCO) and dimethylcyclohexylamine (DMCHA). Examples of metal complexes include, without limitation, bismuth carboxylates, tin carboxylates, tin alkyl carboxylates, tin oxides and tin mercapatans. An example of one suitable catalyst is bibutyltin diluarate (DBTDL).

In some aspects of the present invention, an optional polyol is included in the reaction mixture as a polyisocyanate chain extender.

In some aspects of the present invention the polyol is a short chain diol or triol. Examples of suitable diols and triols include, without limitation, ethylene glycol, diethylene glycol, triethylene glycol, propylene glycol, dipropylene glycol, tripropylene glycol, 1,3-propanediol, 1,3-butanediol, 1,4-butanediol, 1,6-hexanediol, 1,4-cyclohexanedimethanol, a mixture of 1,4- and 1,3-cyclohexanedimethanol (Unoxol diol available from Dow Chemical Co.), glycerol, trimethylolpropane ("TMP") and 1,2,6-hexanetriol In some other aspects of the invention, the polyol is a long chain polyether diol of the structure HO—[$R_1$—O]$_n$—H where $R_1$ is a straight or branched hydrocarbyl or substituted hydrocarbyl chain comprising from 1 to about 20 carbon atoms, where n is from 1 to about 50. Such long chain diols are generally a mixture of compounds having varying "n" values, wherein "n" is expressed as an average. The hydrocarbyl or substituted hydrocarbyl chain can have saturated or unsaturated bonds and substituted or unsubstituted aromatic and cyclic groups. Examples include, but are not limited to, polytetramethylene ether glycol, polyethylene propylene glycol, polyoxypropylene glycol. Suitable polytetramethylene polyols are available commercially and include, for instance, TERATHANE® 250, TERATHANE® 650, TERATHANE® 1000 and TERATHANE® 2000, (where $R_1$ is $C_4H_8$, the average molecular weight is about 250, 650, 1000, and 2000, respectively, and the hydroxyl functionality is 2). In addition, other types of diols are suitable for the practice of the present invention including, but not limited to, polyester, polycarbonate, polycaprolactone, hydroxyl-terminated polybutadien, and mixtures thereof.

Extender structure and chain lengths (molecular weight) are believed to affect polyurethane morphology and influence resultant copolymer elastomeric properties such as providing an increase in tensile strength, elongation, and tear resistance, as well as improving flexural, heat and chemical resistance properties. For instance, copolymer flexibility, impact resistance and optical properties are believed to be positively correlated with polyol chain length such that long chain polyols provide for relatively soft copolymers exhibiting increased flexibility, elongation, impact resistance and clarity properties (increased visible light transmission and reduced haze) as compared to a similar copolymer differing with respect to the presence of a short chain polyol or the absence of a polyol.

Vinyl Polymer Segment

In general, the vinyl polymer segment is formed by a vinyl free radical chain polymerization reaction through contact of the vinyl monomer with a polymerization (decomposition) initiator.

Vinyl monomers of the present invention comprise at least one carbon-carbon double bond, and are known in the art. Examples of suitable vinyl monomers include, but are not limited to, an aromatic vinyl monomers such as styrene, α-methylstyrene, vinyl toluene, t-butylstyrene, cyanostyrene and chlorostyrene; a vinyl cyanide monomer such as acrylonitrile or methacrylonitrile; an acrylate monomer such as methyl acrylate, ethyl acrylate, butyl acrylate, hexyl acrylate, cyclohexyl acrylate, octyl acrylate, decyl acrylate, octadecyl acrylate, hydroxyethyl acrylate, methoxyethyl acrylate, glycidyl acrylate or phenyl acrylate; a methacrylate monomer such as methyl methacrylate, ethyl methacrylate, butyl methacrylate, hexyl methacrylate, cyclohexyl methacrylate, octyl methacrylate, decyl methacrylate, octadecyl methacrylate, glycidyl methacrylate or phenyl methacrylate; an amide monomer such as acrylamide or methacrylamide; an unsaturated carboxylic acid monomer such as acrylic acid, methacrylic acid or itaconic acid; a vinyl halide monomer such as vinyl chloride or vinylidene chloride; an aliphatic vinyl ester monomer such as vinyl formate, vinyl acetate, vinyl propionate, vinyl decanate or vinyl octadecanate; an olefin monomer such as ethylene, propylene, 1-butene, isobutylene or 2-butene; a maleimide monomer such as maleimide, N-methyl maleimide, N-ethyl maleimide, N-propyl maleimide, N-cyclohexyl maleimide, N-phenyl maleimide or N-toluyl maleimide; an acid anhydride monomer such as maleic anhydride; a conjugated diene monomer such as butadiene, isoprene or chloroprene; a vinyl ether monomer such as methyl vinyl ether, ethyl vinyl ether, propyl vinyl ether, hexyl vinyl ether, decyl vinyl ether, octadecyl vinyl ether, phenyl vinyl ether, cresyl vinyl ether or glycidyl vinyl ether; a vinyl ketone monomer such as methyl vinyl ketone or phenyl vinyl ketone; and vinyl pyridine. In some aspects of the invention, the vinyl monomer is methyl methacrylate.

Initiators are known in the art and include organic peroxides including alkyl hydroperoxides, such as t-butyl, p-menthyl or cumyl hydroperoxide, t-butyl perpivalate, and dialkyl or diaryl peroxides, including di-t-butyl or di-cumyl peroxide, 2,5-dimethyl-2,5-di(t)butyl-peroxy(hexane) and dibenzoyl peroxide and (iii) azo compounds such as 2,2'-azobisisobutyronitrile, 2,2'-azobis(2,4-dimethylvaleronitrile), and 2,2'-azobis(4-methoxy-2,4-dimethylvaleronitrile).

In any of the various aspects of the present invention, the vinyl polymer segment is formed from a copolymer reaction mixture comprising a vinyl monomer, a vinyl polymerization initiator, polyisocyanate precursors, a polyurethane catalyst, and a multifunctional monomer. Generally, the copolymer reaction mixture is heated to a temperature and held for a time sufficient to complete the polyvinyl polymerization reaction. For multifunctional monomers wherein the second functional group comprises a double bond, the second functional group copolymerizes with the vinyl monomer. Typically, the vinyl monomer polymerization reaction is done at a temperature of from about 40° C. to about 120° C. or from about 80° C. to about 110° C. and held for a time sufficient to complete the polymerization reaction, typically from about 1 to about 10 hours or from about 2 to about 8 hours. In some aspects of the present invention, the vinyl monomer polymerization reaction and the polyurethane polymerization reaction can be conducted simultaneously.

In any of the various aspects of the present invention, the weights of vinyl monomer and polyisocyanate (and optional polyisocyanate monomer) are selected to provide a copolymer having a polyvinyl segment and a polyurethane segment, wherein percent by weight of the polyurethane segment is about 10%, about 20%, about 30%, about 40%, about 50%, about 60%, about 70%, about 80% or about 90%, and ranges thereof, such as from about 10% to about 90%, from about 30% to about 90%, from about 40% to about 90%, from about 20% to about 60%, from about 30% to about 50%, or from about 30% to about 40%. In some aspects of the invention, the copolymer is formed in the absence of an acrylic crosslinking agent.

Multifunctional Monomer

As disclosed above, the multifunctional monomer is a compound comprising a first functional group comprising an active hydrogen atom that is reactive with an isocyanate moiety and comprising a second functional group reactive with at least one double bond of a vinyl monomer.

The active hydrogen atom of the first functional group may be supplied by any of primary amine, secondary amine or hydroxyl. In some aspects of the present invention, the first functional group comprises at least one hydroxyl, primary amine or secondary amine. In the case of hydroxyl, the isocyanate and hydroxyl react to form a urethane linkage. In the case of primary or secondary amino, the isocyanate and amino react to an urea linkage.

The second functional group moiety that is reactive with the double bond of the vinyl monomer may be a double bond (i.e., alkenyl), such that the second functional group is copolymerizable with the vinyl monomer. As used herein, "alkenyl" refers to groups formed from straight chain, branched or cyclic hydrocarbyl or substituted hydrocarbyl residues containing at least one carbon to carbon double bond, including ethylenically mono-, di- or polyunsaturated alkyl or cycloalkyl groups. For example, such moieties may be unsaturated $C_{2-40}$, $C_{2-20}$ or $C_{2-10}$ alkyl (i.e., alkenyl) or substituted alkyl, substituted or unsubstituted unsaturated cyclic hydrocarbyls, aromatics having unsaturated substituents, unsaturated carboxylic acid and carboxylic acid esters, and vinyl esters. Examples of cyclic and substituted aromatic compounds include norbornene and styrene. Examples of substituted unsaturated carboxylic acids include acrylic acid and methacrylic acid. Examples of unsaturated carboxylic acid esters include methyl acrylate, ethyl acrylate, butyl acrylate, methyl methacrylate and ethyl methacrylate. An example of a vinyl ester compound includes vinyl acetate.

Examples of multifunctional monomers within the scope of the present invention include, without limitation, hydroxyethyl methacrylate (ethylene glycol methacrylate), hydroxyethylacrylate, hydroxypropyl(meth)acrylate, aminoethyl acrylate, 2,2-bis[4-(2-hydroxy-3-methacryloxypropoxy)phenyl]propane, and combinations thereof. In some aspects of the present invention, the multifunctional monomer is selected from hydroxyethyl methacrylate, hydroxyethylacrylate, hydroxypropyl(meth)acrylate, aminoethyl acrylate, and combinations thereof.

In some of aspects of the invention, the equivalent ratio of isocyanate and total equivalents of active hydrogen provided by the sum of the first functional group of the multifunctional monomer and polyol (if present) are generally used in a stoichiometric amount, for instance, the equivalent ratio of isocyanate to active hydrogen is from about 1.05:1 to about 0.95:1, from about 1.02:1 to about 0.98:1, or is about 1:1. Such a copolymer is characterized by an essential absence of free isocyanate. Alternatively stated, the equivalent ratio between polyisocyanate, polyol and multifunctional monomer components may be expressed as a:b:c wherein: a is polyisocyanate and has a value of 1; b polyol and has a value of from 0 to 0.75; c is multifunctional monomer and has a hydroxyl or amino functionality equivalent value of from 0.25 to 1; and b+c is 1.

Copolymers

Various copolymers and preparation methods are within the scope of the present invention.

In some aspects of the present invention, the copolymer is formed from a reaction mixture comprising a polyisocyanate, a urethane catalyst, a vinyl monomer, a free radical polymerization initiator, a multifunctional monomer, and an optional polyol. Reactant characteristics, relative reactant ratios, and reaction conditions are as disclosed herein. In accordance with one aspect of the invention, the urethane catalyst and free radical polymerization initiator are selected based on activity at different temperature ranges such that a two-step reaction may be done. For instance, the urethane catalyst may exhibit sufficient activity in the temperature range of from about 30° C. to about 70° C. or from about 30° C. to about 60° C. and the free radical polymerization initiators may exhibit adequate activity in the temperature range of from about 70° C. to about 120° C. or from about 80° C. to about 110° C. The reaction mixture may first be heated to less than about 70° C. and held for time to complete polyurethane segment formation and thereafter heated to greater than about 70° C. and held for time to complete polyvinyl segment formation. In accordance with another aspect of the invention, the urethane catalyst and free radical polymerization initiator are selected based on activity at a similar temperature range, such as from about 40° C. to about 80° C., so that a single-step reaction may be done wherein polyurethane segment and polyvinyl segment formation occurs substantially simultaneously.

In some other aspects of the present invention, the copolymers are formed from a reaction mixture comprising a polyisocyanate comprising isocyanate functionality, a urethane catalyst, a vinyl monomer, a free radical polymerization initiator, and a multifunctional monomer. In general, a solution is formed from a source of polyisocyanate (comprising free NCO) and a source of vinyl monomer. A multifunctional monomer, an urethane catalyst, a free radical polymerization initiator, and an optional polyol are added to the reaction mixture. The copolymer reaction mixture is then poured into a casting mold and subjected to reaction conditions described herein to form the copolymer. Reactant characteristics, relative reactant ratios, and reaction conditions are as disclosed herein.

In yet other aspects of the present invention, the copolymer is formed from a reaction mixture comprising pre-reacted urethane prepolymer comprising free NCO, an optional polyol, a vinyl monomer, and a multifunctional monomer. In general, a solution is formed from a source of urethane prepolymer (comprising free NCO) and a source of vinyl monomer. A multifunctional monomer, a polyisocyanate, an urethane catalyst and a free radical polymerization initiator, and an optional polyol are added to the reaction mixture. The reaction mixture is then poured into a casting mold and subjected to reaction conditions described herein to form the copolymer. Reactant characteristics, relative reactant ratios, and reaction conditions are as disclosed herein.

Cast sheets formed from the copolymer of the present invention are characterized as having superior impact resistance properties as compared to acrylic cast sheets of similar thickness, while the optical properties are similar.

Visible light transmission of cast sheets having a thickness of about 0.25 inches (0.6 cm) measured substantially in accordance with ASTM D1003 is at least 90% or at least 92%. Haze values of cast sheets having a thickness of about 0.25 inches (0.6 cm) measured substantially in accordance with ASTM D1003 is less than 1% or less than 0.5%.

Low-velocity Gardner impact resistance determined substantially in accordance with ASTM D5420 is at least 40 inch-pounds (about 4.5 N-meters), at least 80 inch-pounds, at least 120 inch-pounds, or at least 160 inch-pounds for cast sheets of 0.125 inch (0.3175 cm) thickness.

V50 critical velocity ballistic test values determined substantially in accordance with MIL-STD-662F-V50 Ballistic Test for Armor for cast sheets of 0.5 inch (about 1.3 cm) is at least 1300 feet per second (about 400 meters per second), 1500 feet per second (about 460 meters per second) or at least 1700 feet per second (520 meters per second). On another basis the V50 values for a cast sheet of the present invention having a thickness of 0.5 inches is at least 30%, at least 40% or at least 50% greater than a control cast sheet of the same thickness formed from polymethacrylate.

Rockwell hardness values determined substantially in accordance with ASTM D785 (M scale) are at least 80, at least 60, at least 40 or at least 20, such as about 30, about 50, about 70, about 90 or about 110. In comparison, the Rockwell hardness of a cast sheet formed from polymethacrylate is typically about 100. In any of the various aspects of the present invention, the Rockwell hardness is from about 50 to about 110 (M scale).

Heat deflection temperature determined substantially in accordance with ASTM D648 is about 50° C., about 60° C., about 70° C., about 80° C., about 90° C., about 100° C. or about 110° C., and ranges thereof, such as from about 50° C. to about 110° C.

Optional Additives

In any of the various aspects of the present invention, the copolymers may be prepared from reaction mixtures comprising one or more optional additives.

The copolymer reaction mixture may include a release agent to promote release of cast sheets prepared from the copolymers of the present invention from the mold. Release agents are known in the art and examples include, without restriction, phosphate esters, alcohol phosphates (e.g., Zelec UN) and dialkyl sodium sulfosuccinate (e.g., Aerosol OT). In some aspects of the present invention, the casting mold surfaces may be treated with the release agent.

The copolymer reaction mixture may further optionally include one or more of the following additives known in the art: biocides (such as anti-bacterials, fungicides and/or mildewicides); anti-fogging agents; bonding agents; dispersants; fire and flame retardants (e.g., ammonium polyphosphate) and smoke suppressants; initiators and catalysts; lubricants; micas; pigments, colorants and dyes (e.g., perylene dye); clarifiers (e.g., unsubstituted bisbenzylidene sorbitols); oil and plasticizers (e.g., paraffinic oil); processing aids; adhesion promoters; silanes, titanates and zirconates; stabilizers (e.g., IRGANOX brand thiodipropionate thermal stabilizer, CAS#123-28-4); ultraviolet light absorbers (e.g., 2,2'-p-phenylene-bis(3,1-benzoxazin-4-one) or nanoparticulate hexaboride such as lanthanum hexaboride); and molecular weight regulators.

Cast Process

Clear sheets having superior impact resistance properties may be prepared from the copolymers of the present invention by cast vinyl sheet processes known in the art. In such a process, the reaction components are mixed and transferred to a mold typically comprising a space between two plates (e.g., tempered glass plates) to provide a sheet having desired thickness. In some aspects of the invention, any of the various copolymer components are combined in a single vessel at ambient temperature, i.e., from about 20° C. to about 30° C. to form a reaction mixture. The mold is then filled with the reaction mixture and sealed, such as with a gasket. The filled mold is heated to cause the reaction mixture to react to form the copolymer. The reaction and curing temperature is controlled by immersing the mold in a bath or by passing heated air over the mold in a circulating air oven. The bath or oven maintain and control the temperature and remove heat generated in the polymerization reaction. A post-curing or annealing step may optionally be done.

EXAMPLES

Various copolymer sheets comprising a urethane segment, an acrylic segment and a multifunctional monomer were prepared from copolymer reaction mixtures. The composition of each reaction mixture is shown in Table 1 below. Each reaction mixture further comprised catalytic amounts of the organo-tin urethane catalyst DBTL (about 0.01 to 0.07 wt %) and the acrylic polymerization initiator organo-peroxide (about 0.05 to 0.07 wt %). For each sheet, the ingredients (a polyisocyanate, multifunctional monomer, vinyl monomer and an optional polyol) were mixed together with the radical initiator, urethane catalyst, and small quantity of release agent. The reaction mixtures were vacuumed to remove dissolved air (oxygen). Each reaction mixture was then poured in to a mold constructed of two glass plates separated by a vinyl gasket (which sets the thickness of the final sheet), and the mold being held together by spring clamps. The molds were then placed in the forced air heating oven and exposed to an initial temperature in the range between 50 and 90° C. (depending on the type and concentration of the radical initiator used) for 10 to 15 hours. Thereafter, the temperature was raised to 100-120° C. in order to complete the vinyl and urethane polymerization reactions. After cooling, the molds were disassembled and the properties of the formed sheets were tested.

In Table 1, "MMA" refers to methylmethacrylate; "HI2MDI" refers to dicyclohexyl methane diisocyanate; "Adiprene LFH2840" refers to polyisocyanate having an average of 8.4 wt % free NCO; "Adiprene LW570" refers to polyisocyanate having an average of 7.5 wt % free NCO; "Baytec WP-260" refers to polyisocyanate having an average of 26.6 wt % free NCO; "Terathane 1000" refers to a polyol having an average molecular weight of 1000 Daltons and an average OH number of 112.5; "HEMA" refers to the multifunctional monomer hydroxyethyl methacrylate;

"Unoxol" refers to the diol cyclohexane dimethanol; "mol" refers to total moles; "eq" refers to total equivalents; Rockwell hardness is reported as M scale units as measured by ASTM D785 M and compared to a control cast polymethylmethacrylate sheet of the same thickness; "HDT" refers to heat deflection temperature in ° C. as measured by ASTM D648; "VLT" refers to visible light transmission and where VLT and haze are measured by ASTM D1003; Gardner impact is measured by modified ASTM D5420 and results are reported in inch-pounds; and "V50 ballistic" refers to V50 critical velocity ballistic test values as determined by MIL-STD-662F-V50 Ballistic Test for Armor with results reported in feet per second. Values in parentheses refer to the thickness of the cast sheet.

TABLE 1

| Component | Control | Example 1 | Example 2 | Example 3 | Example 4 | Example 5 |
|---|---|---|---|---|---|---|
| MMA (wt %) | 99.95 to 99.99 | 49.9 | 59.9 | 69.9 | 59.9 | 59.9 |
| H12MDI (wt %) | — | 16.6 | — | — | — | — |
| H12MDI (eq) | — | 0.13 | — | — | — | — |
| Adiprene LFH2840 (wt %) | — | — | 34.2 | 25.6 | — | — |
| Adiprene LFH2840 (eq) | — | — | 0.068 | 0.051 | — | — |
| Adiprene LW570 (wt %) | — | — | — | — | 33.8 | — |
| Adiprene LW570 (eq) | — | — | — | — | 0.06 | — |
| Baytec WP-260 (wt %) | — | — | — | — | — | 24.38 |
| Baytec WP-260 (eq) | — | — | — | — | — | 0.154 |
| Terathane 1000 (wt %) | — | 27.13 | — | — | — | — |
| Terathane 1000 (eq) | — | 0.054 | — | — | — | — |
| HEMA (wt %) | — | 2.35 | 2.19 | 1.64 | 3.98 | 10.05 |
| HEMA (—OH eq) | — | 0.018 | 0.017 | 0.013 | 0.031 | 0.077 |
| Unoxol (wt %) | — | 3.91 | 3.64 | 2.73 | 2.2 | 5.57 |
| Unoxol (eq) | — | 0.054 | 0.05 | 0.038 | 0.031 | 0.077 |
| Rockwell hardness | 100 | 7 | 10 | 37 | 50 | 104 |
| HDT | 100 | — | — | 67 | 55 | 103 |
| VLT | 92 | 91 | 91 | 91 | 91 | 92 |
| Haze | <0.5 | <1 | <1 | <1 | <1 | 0.4 |
| Gardner impact in*lb (@thickness) | 4 (0.125"); 24 (0.25") | >160 (0.125") | >160 (0.124") | 80 (0.123") | 140 (0.25") | 50 (0.25") |
| V50 ballistic fps(@ 0.5") | 1073 | — | — | — | 1524 | — |

The results show that the impact resistance of the cast urethane-vinyl copolymer sheet is greatly improved, compared to the cast acrylic sheet (PMMA) while the transparency and low level of haze remain essentially unchanged. The results further show that the physical properties of cast copolymers of the invention can be adjusted to meet specifications required for particular copolymer uses and applications. More particularly, copolymer physical properties can be modified by selecting a copolymer reaction mixture wherein one or more of the following are varied: (i) the type and amount of urethane component, (ii) the presence or absence of polyols and, if present, polyol structure and molecular weight, and (iii) the corresponding level of multifunctional monomer. For instance, by appropriate selection of a combination of any of variables (i) to (iii) above and/or any of the other variables described herein, a copolymer exhibiting high flexibility, high impact strength, low hardness and low HDT may be prepared. Alternatively, by another variable combination selection, a copolymer exhibiting high hardness, high brittleness, high HDT and probable high resistance to chemical attack may be prepared. On the basis of the present disclosure, those skilled in the polymer arts may adjust any of the variables disclosed herein, and combinations thereof, to prepare copolymers designed to achieve the desired balance of properties required for a given application or purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A copolymer comprising a reaction product of a reaction mixture comprising the components:
   a polyisocyanate having free isocyanate functionality;
   a polyol;
   a vinyl monomer comprising at least one double bond; and
   a multifunctional monomer comprising a first functional group having a hydrogen that is reactive with isocyanate and selected from the group consisting of a primary amine, a secondary amine and a hydroxyl and a second functional group comprising at least one double bond reactive with the at least one double bond of the vinyl monomer wherein the resulting copolymer is characterized by an essential absence of free isocyanate, wherein the copolymer comprises a polyurethane segment comprising polymerized polyisocyanate and a polyvinyl segment comprising polymerized vinyl monomer,
   wherein the multifunctional monomer is covalently bound to the polyurethane and polyvinyl segments, and wherein the polyurethane segment has a molecular weight of from about 500 to about 5000.

2. The copolymer of claim 1, wherein at least a portion of the polyisocyanate and at least a portion of the polyol are present in the form of a pre-reacted urethane prepolymer.

3. The copolymer of claim 1, wherein the copolymer comprises from about 10 to about 90 percent, by weight of the copolymer, of the polyurethane segment formed from a reaction of the polyisocyanate and the polyol.

4. The copolymer of claim 3, wherein the copolymer comprises from about 40 percent to about 90 percent, by weight of the copolymer, of the polyurethane segment.

5. The copolymer of claim 3, wherein the reaction product forms in the presence of a catalyst for the reaction of isocyanate with the first functional group of the multifunctional monomer or the polyol or both to form the polyurethane segment.

6. The copolymer of claim 1, wherein the multifunctional monomer is selected from the group consisting of hydroxyethylmethacrylate, hydroxyethylacrylate, hydroxypropyl (meth)acrylate, aminoethyl acrylate, and combinations thereof.

7. The copolymer of claim 1, wherein the vinyl monomer is an acrylic monomer.

8. The copolymer of claim 1, wherein the polyol has a first hydroxyl functionality and the multifunctional monomer has a second hydroxyl functionality, and wherein the sum of the first hydroxyl functionality and the second hydroxyl functionality is substantially equal to the free isocyanate functionality of the polyisocyanate on an equivalent basis.

9. A cast sheet material comprising the copolymer of claim 1.

10. The cast sheet material of claim 9 further comprising one or more optional additives selected from the group consisting of: adhesion promoters; biocides; anti-fogging agents; anti-static agents; bonding agents; dispersants; fire retardants; smoke suppressants; initiators; catalysts; lubricants; micas; pigments, colorants; oils; plasticizers; processing aids; release agents; silanes; titanates; zirconates; stabilizers; ultraviolet light absorbers; molecular weight regulators; and combinations thereof.

11. A method of making a cast sheet material, the method comprising the steps of:

(a) forming a reaction mixture of claim 1; and (b) casting the reaction mixture in a mold and reacting the reaction mixture to form a copolymer cast sheet material.

12. The method of claim 11, wherein the multifunctional monomer is present in a stoichiometric amount relative to the available isocyanate functionality of the polyisocyanate.

13. The method of claim 11, wherein the step of forming the copolymer occurs in a single reaction vessel.

14. The method of claim 11, wherein the step of casting comprises filling the mold at ambient temperature with a copolymer composition comprising the copolymer.

15. The copolymer of claim 1 wherein the polyisocyanate and vinyl monomer are polymerized essentially simultaneously.

16. The cast sheet material of claim 9 wherein a sheet having a thickness of about 0.25 inches is characterized by a visible light transmission of at least 90% as measured in accordance with ASTM D1003.

17. The cast sheet material of claim 9 wherein a sheet having a thickness of about 0.25 inches is characterized by a haze value of less than 1% as measured in accordance with ASTM D1003.

18. The cast sheet material of claim 9 characterized by a Rockwell hardness of at least 20 scale M as measured in accordance with ASTM D785.

19. The cast sheet material of claim 9 characterized by a heat deflection temperature of at least 50° C. as measured in accordance with ASTM D648.

20. The cast sheet material of claim 9 wherein a sheet having a thickness of about 0.125 inches is characterized by a low-velocity Gardner impact resistance of at least 40 inch-pounds as measured in accordance with ASTM D5420.

21. The cast sheet material of claim 9 wherein a sheet having a thickness of about 0.5 inches is characterized by a V50 critical velocity ballistic test value in feet per second as measured in accordance with MIL-STD-622F-V50 Ballistic Test for Armor that is at least 30% greater than the V50 critical velocity ballistic test value for a cast sheet formed from polymethacrylate and having a thickness of about 0.5 inches.

* * * * *